United States Patent [19]

Sougawa

[11] Patent Number: 4,934,903

[45] Date of Patent: Jun. 19, 1990

[54] OIL DISCHARGE DETECTING DEVICE FOR MARINE ENGINE

[75] Inventor: Masafumi Sougawa, Hamamatsu, Japan

[73] Assignee: Sanshin Kogyo Kabushiki Kaisha, Hamamatsu, Japan

[21] Appl. No.: 208,165

[22] Filed: Jun. 16, 1988

[30] Foreign Application Priority Data

Jun. 18, 1987 [JP] Japan .................................. 62-151998

[51] Int. Cl.$^5$ ............................................. F04B 49/00
[52] U.S. Cl. ......................................... 417/63; 73/705; 73/707
[58] Field of Search ...................... 417/63, 44; 73/705, 73/713, 707, 115; 116/264

[56] References Cited

U.S. PATENT DOCUMENTS

| 1,347,019 | 7/1920 | Edwards | 184/6.4 |
| 1,957,894 | 5/1934 | Longenecker | 73/707 X |
| 3,209,596 | 10/1965 | Kelly | 73/705 |
| 3,922,111 | 11/1975 | Deters | 417/44 |
| 4,257,748 | 3/1981 | Ives et al. | 417/63 |
| 4,422,831 | 12/1983 | Schmid | 417/63 |

Primary Examiner—Leonard E. Smith
Attorney, Agent, or Firm—Ernest A. Reutler

[57] ABSTRACT

A lubricating system for an internal combustion engine including a separate lubricating pump that operates with cyclically operating pressure. Detecting means are incorporated for damping the output pressure of the pump and sensing the damped pressure to insure adequate operation of the system.

1 Claim, 2 Drawing Sheets

OIL DISCHARGE DETECTING DEVICE FOR MARINE ENGINE

BACKGROUND OF THE INVENTION

This invention relates to an oil discharge detecting device for a marine engine and more particularly to an improved system for insuring that an internal combustion engine is properly lubricated and providing a warning signal in the event of inadequate or improper operation of the lubricant pump.

It is well known that internal combustion engines require lubrication of their running components. With two cycle internal combustion engines, separate lubricating systems have been proposed which will supply lubricant to the engine rather than requiring mixing of the lubricant with the fuel consumed by the engine. These separate lubricating systems normally employ some form of lubricant reservoir, a pump and a delivery system for delivering lubricant from the reservoir to the engine for its lubrication. Although such systems provide good lubrication for the engine and avoid the necessity of having to mix fuel with lubricant, it is desirable to provide an arrangement to insure that this separate lubricating system does not malfunction. Devices have been proposed that will check and register the amount of lubricant in the lubricant storage tank and/or the proper mechanical functioning of the lubricant pump. However, in some instances it may be desirable to monitor the actual pump output so as to insure that the lubricant is being delivered to the engine in adequate amounts. Frequently a reciprocating type pump is operated that has a cyclically varying output. Conventional pressure sensing devices, therefore, are not adequate to sense the output of a pump in such an arrangement.

It is, therefore, a principal object of this invention to provide an improved oil discharge detection device for a marine engine.

It is a further object of this invention to provide an oil discharge detecting device for a separate lubricating system for an engine embodying a cyclically varying pump that will not be sensitive to the cyclic variations in the pump.

It is a further object of this invention to provide an improved arrangement for detecting the output of a reciprocating or cyclically varying pump for an engine lubricating system.

SUMMARY OF THE INVENTION

This invention is adapted to be embodied in a lubricating system for an internal combustion engine having a cyclically varying lubricant pump to pump lubricant from a lubricant source to an engine for lubrication of the engine. In accordance with the invention, sensing means are provided for sensing the output of the lubricant pump including damping means for damping the pressure variations due to the cyclic operation of the pump and means for detecting the damped pressure.

DETAILED DESCRIPTION OF THE PREFERRED EMBODIMENT

Figure 1:
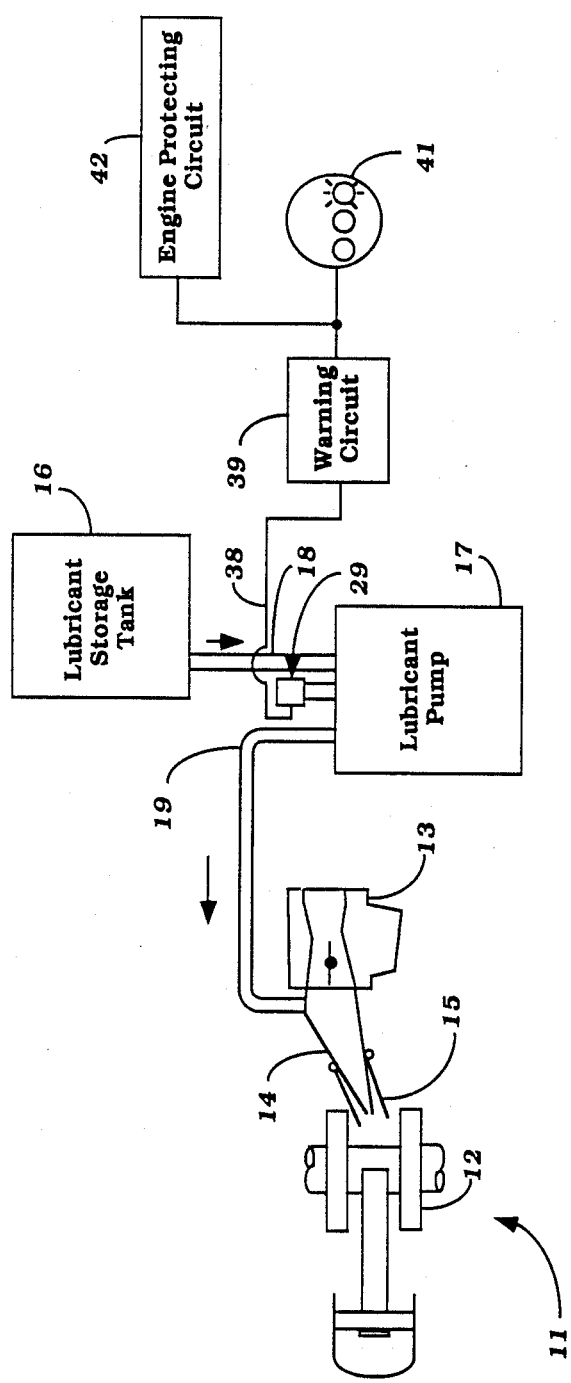
FIG. 1 is a partially schematic view showing a marine engine and lubricating system therefor.

Referring in detail to the drawings and particularly to FIG. 1, a two cycle internal combustion engine lubricated by a lubricating system constructed in accordance with the invention is identified generally by the reference numeral 11. The two cycle engine 11 may be of any known type and is depicted as being of the single cylinder reciprocating type having a crankshaft 12 that is supported for rotation about a generally vertically disposed rotational axis. This is a typical orientation in connection with marine outboard motors. It is to be understood, however, that the invention may be employed in conjunction with other engine configurations in other applications.

Since the invention is directed primarily to the lubricating system for the engine, details of the engine have not been illustrated and are not believed to be necessary to understand the construction and operation of the invention.

The engine 11 is provided with a charge forming system which, in the illustrated embodiment, comprises a carburetor 13 which forms a fuel air mixture and discharges it to the crankcase of the engine 11 through an intake manifold 14. A reed type check valve assembly 15 is positioned within the manifold 14 so that the charge will flow only from the charge forming device 13 to the crankcase in which the crankshaft 12 supported for rotation and not in the reverse direction. The compressed charge is transferred to the combustion chamber of the engine for firing in a known manner and, as aforenoted, these details of the construction of the engine may be considered to conventional.

The engine 11 is also provided with a separate lubricating system which includes a lubricant storage tank 16 in which lubricant contained. Lubricant flows from the storage tank 16 to a lubricant pump 17 through a supply conduit 18. Lubricant is discharged from the lubricant pump 17 to the engine through a lubricant supply conduit 19. In the illustrated embodiment, the lubricant is discharged into the intake manifold 14 downstream of the carburetor 13 for mixing with the intake charge. It is to be understood, however, that the lubricant may be supplied directly to certain components of the engine to be lubricated in addition to or in lieu of the mixing with the intake charge. Again, the details of the specific way in which the engine is lubricated form no part of the invention.

Figure 2:
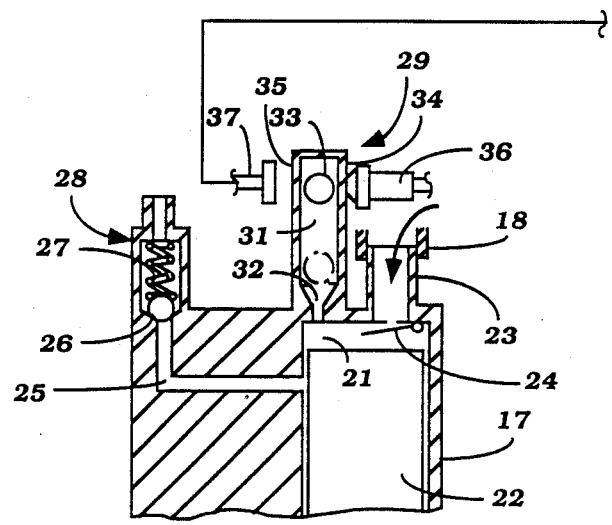
FIG. 2 is an enlarged cross-sectional view of a portion of the lubrication system showing the detecting device constructed in accordance with an embodiment of the invention.

Referring now in detail primarily to FIG. 2, the lubricant pump 17 is of the reciprocating type so that its discharge will cyclically vary. In the illustrated embodiment, the lubricant pump 17 is comprised of a pumping chamber 21 in which a piston 22 is supported for reciprocation. The piston 22 is driven in any suitable manner, for example by being driven from the engine crankshaft 12 either directly or through a gear train. Other forms of driving arrangements may be employed.

Lubricant is delivered to the pumping chamber 21 through the conduit 18 to an inlet fitting 23 formed in the body of the pump 17. A check valve 24 is positioned at the inlet fitting 23 so that lubricant will not be returned through the conduit 18 when the piston 22 is undergoing its pumping stroke.

Under the pumping condition, lubricant is delivered through an internal passage 25 of the pump 17 to a delivery check valve comprised of a ball type valve 26 and a coil compression spring 27. The delivery check valve is positioned in a fitting 28 that communicates with the conduit 19 for delivering lubricant to the engine in the manner aforedescribed.

In accordance with the invention, a sensing device, indicated generally by the reference numeral 29 is provided for sensing the output pressure of the lubricant pump 17. Because this output pressure cyclically varies, the sensing device 29 also includes a damping arrangement for damping the pulsations of the pump output so as to avoid erroneous readings.

The sensing device comprises a chamber 31 that communicates with the pumping chamber 21 through a damping orifice 32. Provision of the orifice 32 insures that the pressure in the chamber 31 will be averaged and will not sense to any significant degree the cyclic variations in the pressure in the pumping chamber 21. A ball type indicating member 33 is supported within the chamber 31 and will move to a position within the chamber 31 that is dependent upon the average pump pressure. At a point where the ball 33 will normally be maintained when adequate lubricant pressure exists there are provided a pair of aligned windows 34 and 35 on diametrically opposite sides of the chamber 31. A light emitting diode 36 registers with the window 34 and a light receiving diode 37 registers with the window 35. When adequate pump pressure exists, the ball member 33 will obscure the transmission of light from the light emitting diode 36 to the light receiving diode 37 and there will be no output signal. However, if the light pressure falls below normal pump pressure due to some malfunction or the lack of adequate lubricant in the storage tank 16, the ball will fall to the phantom line position shown in FIG. 2 and the light emitting diode 36 will shine upon the light receiving diode 37. When this occurs, an output signal will be transmitted through a conductor 38.

The conductor 38 provides the output signal to a warning circuit 39 which will output a signal when the light receiving diode 37 is energized by receiving light from the light emitting diode 36. This output signal from the sensing circuit 39 can be used either to illuminate a warning light 41, warning buzzer or combination of them, and/or a circuit 42 that will either stop the running of the engine 11 or reduce its speed and then stop it if the low oil pressure situation prevails. Various known circuits can be employed for these purposes.

It should be readily apparent from the foregoing description that the device disclosed is extremely effective in sensing pump output pressure without being adversely affected by cyclic variations due to the normal operation of the pump. As a result, the engine will be well protected and an operator will be warned of any malfunction in the lubricating system. It is to be understood that this described embodiment is only a preferred embodiment and that various changes and modifications may be made without departing from the spirit and scope of the invention, as defined by the appended claims.

I claim:

1. A lubricating system for an internal combustion engine having a cyclically varying lubricant pump for pumping lubricant from a lubricant source to an engine for lubrication of said engine, sensing means for sensing the output of said lubricant pump including damping means for damping pressure variations due to the cyclic operation of said pump and means for detecting the damped pressure comprising a chamber communicating with the output of the pump through a restricted orifice, and means for detecting the pressure in said chamber comprises a member moveable by pressure in the chamber to a predetermined location and optical sensing means for sensing the location of said member.

* * * * *